May 11, 1943.  C. R. FORDYCE ET AL  2,319,051
HIGH SPEED METHOD OF MAKING CELLULOSE ORGANIC
DERIVATIVE FILM AND SHEETING
Filed May 25, 1939  2 Sheets-Sheet 1

CHARLES R. FORDYCE
WALKER F. HUNTER, JR.
INVENTORS

BY
ATTORNEYS

Patented May 11, 1943

2,319,051

UNITED STATES PATENT OFFICE 2,319,051

HIGH SPEED METHOD OF MAKING CELLULOSE ORGANIC DERIVATIVE FILM AND SHEETING

Charles R. Fordyce and Walker F. Hunter, Jr., Rochester, N. Y., assignors to Eastman Kodak Company, Rochester, N. Y., a corporation of New Jersey Application May 25, 1939, Serial No. 275,712

9 Claims. (Cl. 18—57)

This invention relates to a high speed method of making attenuated cellulose derivative products, such as film and sheeting, and more particularly to a method of making such products which is characterized by the use of cellulose organic acid ester compositions of hitherto unkown properties.

As is well known, cellulose derivative sheets or films are ordinarily produced by depositing a cellulose derivative solution or dope in the form of a film on the highly polished surface of a slowly rotating wheel or band, causing the film to set by evaporation of solvent, stripping the film and curing out residual solvent. The dope compositions heretofore employed for this purpose have been solutions which "set" or reach a solid or semi-solid condition, permitting removal from the forming surface only by gradual evaporation of solvent. With such dopes most of the solvent must be removed (leaving not much more than 20–25% of solvent, based upon the weight of the sheet) before satisfactory stripping of the film can be accomplished. This necessitates a relatively long period of preliminary curing on the wheel. Furthermore, the length of time required for proper setting is increased by the fact that, since such dopes remain fluid or semi-fluid until most of the solvent has evaporated (and, therefore, must be supported on the wheel surface), evaporation of solvent can take place only from the outside surface of the deposited film. In addition, such dopes tend to skin over on the outside surface because of more rapid loss of solvent from the upper layers of film material and this further increases the setting time.

The advantages of bringing the film material into a solid or semi-solid condition as early in the film-forming operation as possible are apparent. Obviously, any reduction in the stripping time, that is, the time during which the film must remain on the wheel before it can be properly stripped, directly increases production speed. Moreover, if the film can be removed from the wheel while still containing considerable solvent, more rapid curing can be attained, because under such conditions the film can be so handled and treated as to permit curing out of solvent from both surfaces simultaneously. An additional advantage is that early solidification or colloidization results in a preferred micellar mat-like structure with attendant improvement in the quality of the finished product. The ideal film-forming operation would, therefore, be one in which the dope could be brought, immediately after casting, into a set or non-fluid condition while still containing all, or nearly all, of its original solvent— a condition which would permit almost immediate stripping (thus reducing stripping time to a minimum) and curing solvent from both surfaces of the film simultaneously.

Numerous attempts have been made to realize this ideal. For example, it has been proposed to use mixtures of low and high-boiling solvents in the dope, so chosen that by rapidly evaporating the low boiling component a very concentrated solution of the cellulose derivative in the high boiling component would remain. It has also been proposed to coagulate cellulose derivative solutions by means of non-solvent liquids or vapors. While such expedients have resulted in some improvement, until the advent of the present invention the ideal operation has never been attained.

As a further indication of the state of the art, it may be said that the broad phenomenon of gelation of certain types of cellulose derivative solutions under the influence of temperature change has been observed from time to time by various workers in the cellulosic field. It has been recognized, for example, that certain organic liquids which are non-solvents for cellulose acetate and other cellulose organic acid esters at ordinary temperatures become solvents at elevated or moderately elevated temperatures and that if solutions are formed at the high temperatures and coated on a metal or other surface and cooled down, a tenaciously adhering lacquer coating results. It has also been recognized that by heating a suspension of cellulose acetate in ethylene dichloride (a cellulose acetate non-solvent at ordinary temperatures) to about 30–60° C., the cellulose acetate goes into solution to form a clear solution and when such a solution is coated on a surface, cooled and cured to remove the solvent, a clear transparent film results. In other words, while a hot ethylene chloride solution of cellulose acetate will gel upon coating or casting upon a film-forming surface, this phenomenon does not increase the speed of production of sheeting therefrom because such a film cannot be stripped and handled while containing any more solvent than the ordinary cellulose acetate dope wherein acetone and the like are solvents. In other words the gel so formed is not self-supporting. Workers in this field have never gone much beyond a recognition of the phenomenon that certain dopes are capable of gelling and others are not. Until the present invention, no practical application of the phenomenon of gelation to film-forming operations has ever been made.

This invention has as an object to provide a high speed method of making cellulose derivative sheeting adapted for use as photographic film support and for other purposes. A further object is to provide a method of making cellulose organic acid ester film or sheeting by coating or casting a dope on a film-forming surface, characterized by the fact that the film may be removed or stripped from the surface while still containing a large proportion of solvent. A still further object is to provide a method of making such film or sheeting in which film formation takes place almost immediately upon deposition of the dope. Another object is to provide a method of cellulose ester film or sheet formation in which the film can be removed from the forming or casting surface almost immediately after gelation while containing large proportions of solvent and is in such condition that residual solvent may readily be cured out of both surfaces simultaneously. Another object is to produce cellulose organic derivative sheeting having high tensile strength and flexibility and a low swell and shrink amplitude. Other objects will appear hereinafter.

These objects are accomplished by the following invention, which, in its broader aspects, comprises dissolving at elevated or moderately elevated temperatures certain cellulose organic acid esters such as certain cellulose acetate propionates and cellulose acetate butyrates and the like in a solvent mixture consisting of toluene and a lower aliphatic alcohol to give solutions or dopes which are susceptible of gelation by a rapid lowering of temperature; a sheet or film resulting from such gelation may be stripped from the casting surface almost immediately after casting and while containing nearly all or at least a large proportion of the original solvent.

We have found that solutions of this character, the composition and preparation of which will be described in more detail hereinafter, possess certain unusual and unexpected characteristics which render them outstanding for the specific purposes of the instant invention. Among other things, (1) they are fluid at temperatures above 50° C.; (2) when allowed to cool to or below a critical temperature between 10°–50° C. (depending upon the composition) they form entirely transparent gels which remain homogeneous throughout the gelling operation, such gelation occurring within approximately 20° C. of the flowable solution point; (3) the gels when first formed do not adhere strongly to surfaces such as metal, glass, etc.; (4) the gels are sufficiently strong and resistant to deformation that they can be handled while still containing large quantities of solvent, i. e., an amount of solvent equal to or greater than the weight of the cellulose ester; (5) the nature or structure of the gels is such that they readily release their volatile solvents and the solvent can be driven off without employing high temperatures.

Inasmuch as it is necessary only to coat or cast the warm solution, cool, and strip almost immediately (due to the fact that the cold-setting or gelation effect produces at once a strong tough gel), an unusual and wholly unexpected increase in film-forming speed is attained. When one takes into account the fact that ordinary film-forming processes generally involve the use of dopes which require in some cases as much as fifteen or twenty minutes preliminary curing on the casting wheel or other surfaces before the material reaches a stage in which it can be successfully stripped, the tremendous increase in manufacturing speed made possible by the present method will be apparent.

In the following examples and description we have set forth several of the preferred embodiments of our invention, but they are included merely for purposes of illustration and not as a limitation thereof.

These figures make use of triangular charts to identify the chemical composition of cellulose esters. The composition in per cent acetyl may be plotted along the line "AB" and the per cent higher acyl (such as propionyl or butyryl) plotted along "AC." Then the points "$ta$," "$tb$" and "$tp$" will represent cellulose triacetate, tributyrate and tripropionate respectively. The line connecting "$ta$" and "$tb$" will represent fully esterified mixed esters of acetic and butyric acid and the line connecting "$ta$" and "$tp$" fully esterified mixed esters of acetic and propionic acids. Hydrolyzed mixed esters will fall within the areas above the fully esterified products The shaded areas on these charts include cellulose mixed esters which we have found useful. The particular solvent combinations which can be successfully employed to obtain solutions upon heating which exhibit proper gelation when cooled depend to some extent upon the cellulose ester with which they are used. In general the alcohol content of the toluene-alcohol mixture may be either above or below the amount necessary to produce solution at room temperature. For example, a cellulose acetate propionate of 14% acetyl and 31% propionyl content will dissolve at room temperature in a solvent mixture composed of 60% toluene and 40% iso-propyl alcohol. If, however, the alcohol content of the solvent mixture is lowered to 15%, the cellulose ester dissolves only upon heating to approximately 60° C., and the solution obtained exhibits rapid gelation when allowed to cool below approximately 30° C.

The alcohols which may be used in our solvent compositions are aliphatic monohydric alcohols of not more than five carbon atoms. Cellulose esters of lower propionyl or butyryl content, lying more nearly to the left of the shaded areas, should in general be used with solvent mixtures containing lower boiling alcohols, while with cellulose esters of higher propionyl or butyryl contents, more nearly approaching the right-hand borders of the shaded areas, higher boiling alcohols would be most suitable. Alcohols of intermediate boiling range may be employed with equal facility at practically all points within the shaded areas.

Figure 2:
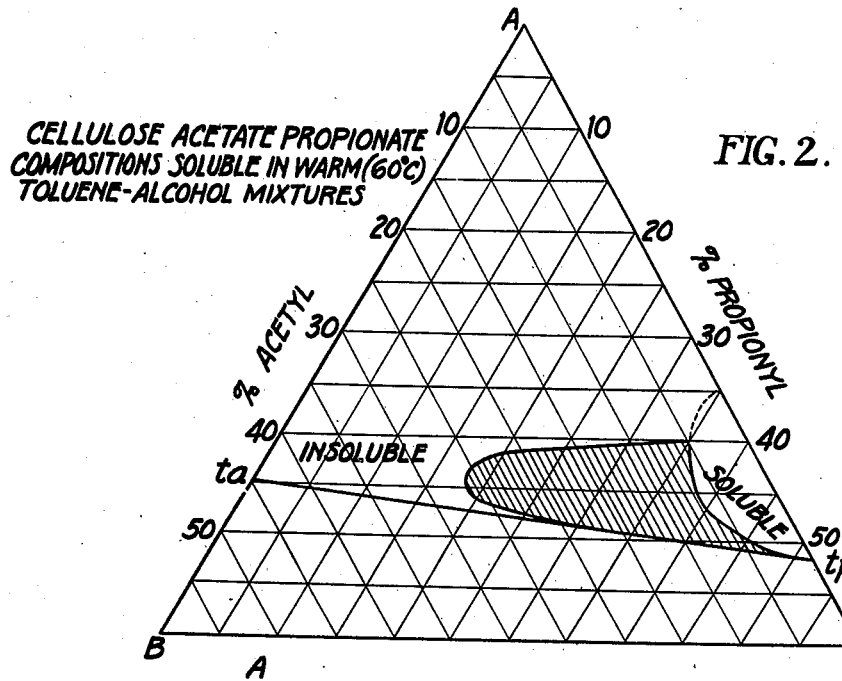
Fig. 2 is a chart showing graphically the various cellulose acetate propionates which may be employed according to our invention when dissolved in appropriate mixtures of alcohols and toluene.
Figure 3:
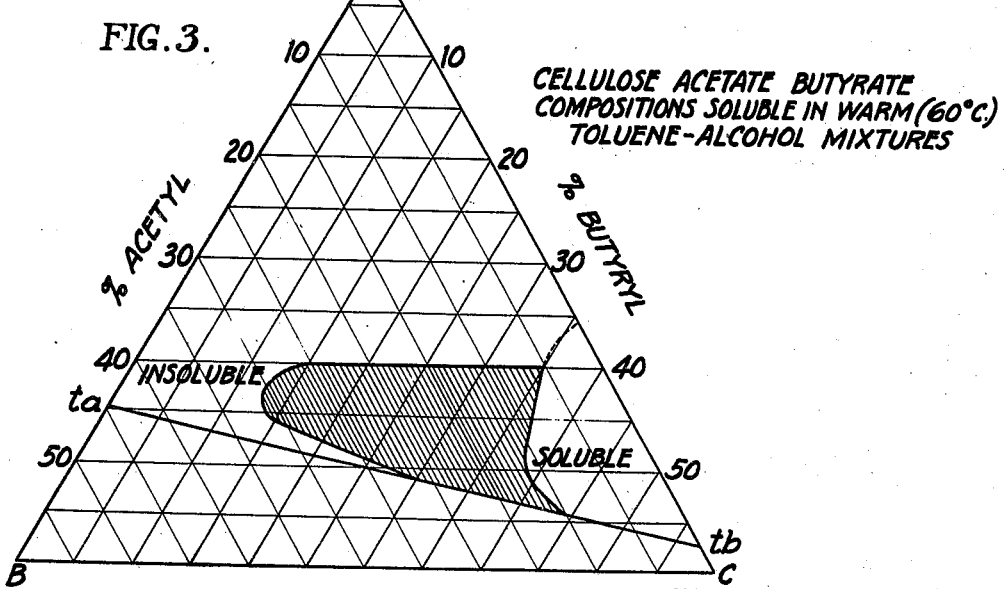
Fig. 3 is a similar graphical representation of the various cellulose acetate butyrates which may be similarly employed.

In order to prepare a solution of a cellulose ester of a composition within the shaded areas on Figures 2 or 3 which would exhibit the above-described properties of dissolving only at elevated temperatures and producing upon cooling a gel which can be readily removed in the form of a film from a coating surface, it is necessary to take into consideration the relation of a specific cellulose ester to the solvent combination employed. A cellulose acetate propionate containing 40% propionyl and 8% acetyl content which, referring to Figure 2, would lie in the lower right-hand section of the shaded area, would give most satisfactory results with butyl or amyl alcohols in quantities of 40-50% of the solvent mixture while a cellulose acetate propionate of 23% acetyl and 21% propionyl content which would be located to the extreme left of the shaded area on Figure 2 would yield its best results with a lower alcohol such as ethyl or iso-propyl alcohol in quantities of 20-30% of the solvent mixture.

In a similar manner, a cellulose acetate butyrate of 25% acetyl and 20% butyryl content which lies well to the left of the shaded area on Figure 3 would give best results with a solvent mixture of about 40% ethyl alcohol and 60% toluene, while a cellulose ester lying near the right-hand border of the shaded area such as a cellulose acetate butyrate of 13% acetyl and 35% butyryl content would be employed with a solvent mixture composed of 50-70% of butyl or amyl alcohol with 30-50% toluene. Thus it may be seen that, while any of the alcohols from 1 to 5 carbon atoms may be employed with toluene for any of the cellulose esters included in the shaded areas of Figures 2 and 3, in accordance with our invention, the most favorable alcohol for the selected cellulose mixed ester will be chosen.

In place of toluene we may employ mixtures of toluene with other hydrocarbons such as benzene, xylene, or minor quantities of ligroin. With cellulose esters of higher propionyl or butyryl content xylene may completely replace toluene if less volatile solvents are desirable. For more rapid rates of evaporation it is possible to prepare solutions using benzene to entirely replace toluene and obtain satisfactory gelling characteristics, but suitable solvents are critical in composition and tend toward blushing of the films during evaporation. Toluene may with advantage be partially replaced by benzene to increase speed of evaporation provided the benzene is used in minor quantities.

The most preferred compositions for our purposes are solvent mixtures of toluene with alcohols of 3 to 5 carbon atoms, the quantity of alcohol being less than that of toluene. Such solutions allow the greatest latitude of film casting operation and produce films of optimum physical properties.

It will be understood from the chart of Figures 2 and 3 that the cellullose acetate propionates and cellulose acetate butyrates employed in accordance with our invention are those containing not less than about 18% propionyl and not less than about 13% butyryl, respectively, and of not less than about 40% total acyl content. Cellulose esters of less than 18% propionyl and 13% butyryl contents, respectively, lying to the left of the shaded areas, cannot be employed in these compositions because they are insoluble in the solvent mixtures even at elevated temperatures.

It will be understood that the areas of Figures 2 and 3 are not intended to include all of those cellulose acetate propionates and cellulose acetate butyrates which may be soluble at elevated temperatures, but are intended to include only those esters which are soluble at elevated temperatures and are susceptible of gelation within the temperature range of 10-50° C. to give clear, transparent films. In other words, certain of the cellulose acetate propionates and cellulose acetate butyrates which lie above the respective shadded areas may be put in solution at elevated temperature, but such solutions upon cooling and gelation give films which are hazy, translucent, or even opaque, i. e., films which would be inoperative when used as photographic film support or for purposes in which a clear, transparent material is essential.

Referring to Figure 2, cellulose acetate propionates of over 35% propionyl content and not more than 5% acetyl are soluble in these solvent mixtures even at room temperature and do not possess the desired gelation characteristics.

Referring to Figure 3, cellulose acetate butyrates containing over about 35% butyryl and not more than about 10% acetyl likewise are soluble in the various solvent mixtures even at room temperature and are unsusceptible of the gelation phenomenon which is characteristic of our invention.

It will also be understood by reference to Figures 2 and 3 that the compositions regarded as operative according to our invention are those included within the respective shaded areas. The compositions which fall within those areas of Figures 2 and 3 which are designated, respectively, insoluble and soluble, are, for the purposes of our invention, to be regarded as substantially inoperative. However, it will be understood that the compositions included within the shaded areas of Figures 2 and 3 are not to be regarded as absolute, since solutions of the gelation type may be obtained, in accordance with our invention, by employing cellulose mixed organic acid esters which fall slightly without the boundaries of this area. Those skilled in the art will of course appreciate the fact that in such cases there is always a border land or twilight zone extending beyond the specifically indicated boundaries in which certain operative compositions will fall. For optimum results, however, one should select esters which fall well within the boundaries of the shaded area of Figs. 2 and 3.

Plasticizers may be used in varying quantities in the above compositions and have a minor effect upon the gelation behavior. Use of triphenyl phosphate in quantities as high as 25% of the weight of the cellulose ester does not produce any measurable change in gelation temperature, stripping time, or other phases of the film-forming operation. Liquid plasticizers used in large quantities usually require a minor adjustment in solvent mixtures, such as a decrease in the quantity of more active solvent by 5-10%.

Before proceeding to specific examples of our process it is desirable to describe the general aspects of a typical film or sheet-forming procedure in accordance with our invention and one type of appropriate apparatus for carrying it out.

Figure 1:
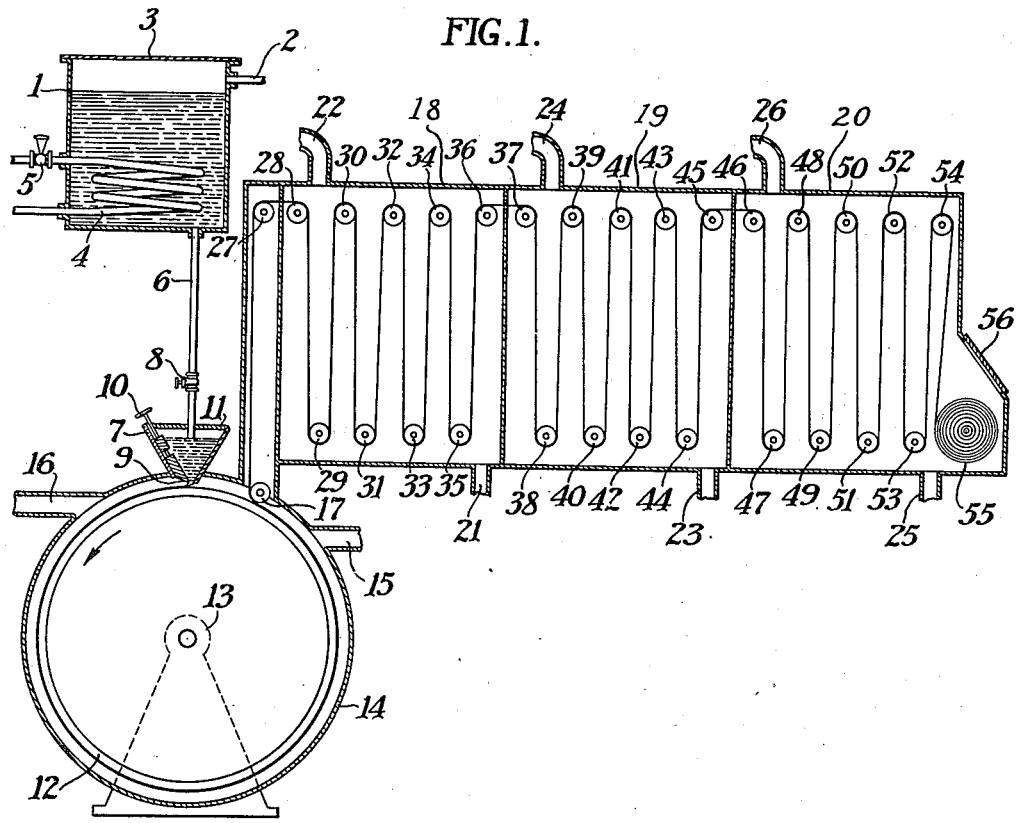
Fig. 1 is a diagrammatic elevational sectional view of a conventional type of device which may be employed for carrying out a typical film-forming operation in accordance with our invention.

Referring to Fig. 1 of the drawings, numeral 1 designates a dope storage or supply tank provided with an inlet conduit 2 for admission of the previously prepared dope. The tank is provided with a removable cover 3 for permitting inspection of the contents and for other purposes and also provided with a heating coil 4 through which a flow of an appropriate heating fluid such as hot water or steam is maintained by means of thermostatically controlled valve 5. The flow of the heated fluid is so regulated as to maintain the dope in the tank 1 at a constant temperature.

Numeral 6 designates a feed conduit (which may be provided with lagging of an appropriate type for preventing heat losses as far as possible) through which the heated dope is passed to a standard form of dope hopper 7, flow of the dope being controlled by means of valve 8.

The dope hopper is provided with an adjustable gate member 9 for controlling the thickness of the dope stream which flows from the hopper. Adjustment of the gate member 9 may be by thumb screw 10 threaded through one wall of the hopper. The hopper is provided with a cover 11 to prevent solvent and heat losses and is also preferably supplied with external or internal heating means (not shown) for maintaining the dope at a constant temperature.

Positioned below the hopper 7 is the coating or casting wheel 12 mounted in suitable bearings 13 and surrounded by air casing 14, the wheel being adapted to rotate in the direction indicated by the arrow. The wheel is provided with appropriate cooling means (not shown) whereby its film-forming surface is cooled to an appropriate temperature equal to or below the gelation temperature of the particular dope employed in a given film-forming operation. Casing 14 is provided with air inlet conduit 15 and outlet conduit 16 for conducting a current of heated air around the wheel counter-currently to the path of the film undergoing formation.

The wheel is driven by appropriate mechanism (not shown) of such nature that any desired rotational speeds may be attained. Numeral 17 designates a conventional stripping roll over which the formed film passes on its way to the curing device, which comprises a plurality of air sections 18, 19, and 20. These air sections are provided, respectively, with air inlet conduits 21, 23, and 25 and with air outlets 22, 24, and 26 which provide a means of conducting heated air through each section in the general direction indicated by the arrows.

Numeral 27 designates a guide roll over which the film passes, after leaving stripping roll 17, on its way to the first air section. Numerals 28, 29, 30, etc., designate a series of rolls in the respective air sections over which the film or sheet material passes on its way to the wind-up 55 located in the last air section 20. These rolls are driven, preferably by means of the so-called tendency drive which permits the film to travel through the air section in a substantially freely supported condition, this type of drive compensating for any longitudinal changes of dimension which may take place in the film material during the curing operation.

The numeral 56 designates a hinged door which gives access to the last air section 20 and through which rolls of the finished product may be removed from time to time.

A typical film-forming operation may be carried out as follows:

An appropriate dope composition, previously thoroughly mixed in another container at an appropriate temperature, is fed into the mixing tank 1 through the conduit 2. Care is taken to maintain the dope, prior to contact with the wheel surface, at a temperature well above its gelation point and in a readily flowable condition. The warm dope passes by means of conduit 6 into dope hopper 7 from which it flows onto the wheel in a stream, the thickness of which is regulated by appropriate adjustment of gate member 9 to give the desired eventual film thickness, for example, .005 inch.

As previously indicated, the wheel surface is maintained at a temperature equal to or below the gelation temperature or temperature range of the particular dope in question and the wheel is driven at such a peripheral speed as to give the desired speed of film formation. As the dope contacts the cold wheel surface gelation takes place almost immediately, and, at the expiration of a substantially insignificant period of time, the film material has reached a condition in which it may be removed from the wheel at the stripping roll 17. Although it is not necessary to subject the film to any considerable amount of curing on the wheel, it is generally best to remove a certain amount of solvent from the gelled film material at this point in the process. To this end air is admitted to wheel casing 14 through conduit 15 and passes countercurrently around the outside surface of the film, the solvent-laden air being finally conveyed out of the apparatus through conduit 16. The air temperature may be adjusted to or below room temperature or it may be heated to as high as approximately 40° C. or over, the particular temperature depending upon the composition of the dope in question, the wheel speed, and various other factors.

The nature of the dope being such that it sets almost immediately into a rigid gel upon contacting the cold wheel surface, the film may be readily stripped upon reaching stripping roll 17. At this point the film contains a substantial amount of solvent, the exact amount, of course, being dependent on wheel speed, temperature of the casing air and other factors. As will be apparent, when it is practical to operate the wheel at a sufficiently high speed, the film may be removed from the film-forming surface while still containing practically all of its original solvent. Under no circumstances is it necessary to bring the solvent content down to a point below that at which the weight of the solvent equals the weight of the cellulose organic acid ester. Under ordinary circumstances the wheel is operated at such a speed that the film contains anywhere from 50% to 80% of solvent at the time of stripping.

After stripping, the film is conducted into the first air section 18, where it is subjected to the action of a current of air heated, for example, to about 40–60° C. Solvent is removed progressively with travel of the film through the air section. The film upon emerging from the first air section passes immediately into the next air section where it is subjected to the action of air heated to a temperature of about 40–80° C. and finally into the air section 20, where it is subjected to the action of air heated from about 85–95° C. By the time the film reaches the wind-up 55 it has lost substantially all of its original solvent content and is then in suitable condition for use as photographic film support and many other purposes.

Our invention will be more readily understood by reference to a number of specific examples illustrating preferred embodiments thereof.

*Example 1*

A solution of 100 parts by weight of cellulose acetate propionate of 20% acetyl and 25.7% propionyl content in a mixture of 280 parts of toluene and 120 parts of iso-propyl alcohol was prepared by heating the solvent mixture to 70° C., then adding the cellulose ester with stirring. The resulting solution was filtered while still hot to remove incompletely dissolved particles and the filtered dope held at 60° C. until ready for use. When the solution was cooled to below 50° C. a noticeable increase of viscosity occurred and at room temperature the solution had lost its fluidity, becoming a quite rigid gel.

A portion of the solution at 60° C. was coated in a thin layer of uniform thickness onto a glass plate having a temperature of 20° C. The solution set almost immediately to a rigid gel under the influence of the lowered temperature. The material was allowed to stand in a current of air at 20° C. for two minutes and was then stripped from the glass and incubated at 40° C. to remove volatile solvents. A transparent film of very high toughness and tensile strength was obtained.

Example 2

A solution of 100 parts by weight of cellulose acetate propionate of 8.9% acetyl and 38.7% propionyl content in a solvent mixture of 450 parts of toluene and 50 parts of iso-propyl alcohol was prepared at 60° C. The resulting dope was filtered and held at 50° C. until ready for use. Upon cooling, the solution was transformed to a non-fluid gel.

A portion of the solution at 50° C. was coated into the form of a film as in Example 1, the film-forming surface in this case being maintained at 20° C. and the film being removed from the casting surface after one-half minute then cured in a current of air at 40° C.

Example 3

A solution of 100 parts by weight of a cellulose acetate butyrate containing 25% acetyl and 20.7% butyryl in a solvent mixture composed of 420 parts of toluene and 180 parts of n-propyl alcohol was prepared by mixing the ingredients with continued stirring at 70° C. The solution was then filtered to remove incompletely dissolved particles and fed to the supply tank of a film-forming apparatus such as that illustrated in Fig. 1. The temperature of the dope in the tank was maintained at 60° C.

The dope was admitted to the hopper where its temperature was maintained at about 50° C. The gate of the hopper was so adjusted as to feed a stream of the warm dope to the wheel surface of such thickness as to give an eventual film thickness of .005 inch, the wheel being maintained at a constant temperature of about 15° C. The wheel was rotated at such a speed that the film remained on the film-forming surface for about six minutes during which time a current of air having an inlet temperature of about 30° C. was passed through the space around the wheel in a direction countercurrent to that of the movement of the film.

The warm dope, immediately upon coming in contact with the cold wheel surface, was transformed into a non-fluid gel. After completing somewhat more than three-quarters of a revolution on the wheel, the film was stripped from the film-forming surface and was thereafter carried through the three air sections where it was subjected to the curing action of a current of moderately heated air. The air passing through the first air section had an inlet temperature of about 50° C. providing an average temperature in the section of 45° C. The path and speed are such that the film in this section took approximately 16 minutes to travel therethrough. The average temperature of the second air section was 65° C., and of the third section 80° C., the path and speed of the film being such that any given portion thereof remained in these air sections for a period of approximately 16 minutes.

The film at the point of stripping was found to contain about 60% solvent under the particular conditions of coating. The finished film was found to have high tensile strength, and high flexibility.

By a procedure similar to that of Example 1 a number of cellulose acetate propionates of varying composition were dissolved in mixtures of toluene and iso-propyl alcohol in proper ratio to give the most desirable gelling characteristics when cooled. These compositions are described in the following table:

| Example | Per cent acetyl | Per cent propionyl | Solvent ratio | Per cent alcohol in solvent | Time on casting surface before stripping |
|---|---|---|---|---|---|
| | | | | | Minutes |
| 4 | 16.1 | 33.0 | 7-1 | 30 | 1.5 |
| 5 | 13.6 | 28.8 | 7-1 | 40 | 0.2 |
| 6 | 9.4 | 40.5 | 4-1 | 60 | 3.0 |

Cellulose acetate butyrates of varying composition were dissolved in mixtures of toluene with aliphatic alcohols as tabulated below, to give solutions at 60° C. which upon cooling produced homogeneous rigid gels:

| Example | Per cent acetyl | Per cent butyryl | Solvent ratio | Alcohol | Per cent alcohol | Time on casting surface before stripping |
|---|---|---|---|---|---|---|
| | | | | | | Minutes |
| 7 | 21.4 | 28.6 | 5-1 | sec-Amyl | 40 | 0.4 |
| 8 | 16.3 | 29.3 | 5½-1 | Iso-propyl | 15 | 0.5 |
| 9 | 16.2 | 36.0 | 5-1 | do | 10 | 2.0 |
| 10 | 13.5 | 36.0 | 4-1 | do | 80 | 1.3 |
| 11 | 9.5 | 32.8 | 4-1 | sec-Amyl | 50 | 0.3 |
| 12 | 30.0 | 16.5 | 6-1 | n-Butyl | 30 | 0.2 |
| 13 | 30.0 | 16.5 | 6-1 | ter-Butyl | 30 | 0.2 |
| 14 | 25.1 | 20.7 | 6-1 | Ethyl | 40 | 0.8 |

It will of course be understood that the particular film-forming composition employed in a given case will depend upon such practical matters as the temperature of the casting surface which it is desired or practical to employ, the temperature at which the cellulose ester may be placed in solution and various other factors.

The solvent combinations within the scope of our invention may be modified to produce solutions of cellulose esters at elevated temperatures which will vary in gelling temperatures depending upon the proportions of toluene and alcohol employed. For a given cellulose ester chosen within the shaded areas of Figures 2 and 3, there is an optimum proportion of alcohol with toluene to produce the most active solvent mixture. In many cases, this mixture may be a solvent for the cellulose ester at room temperature. By changing the composition of such a solvent mixture toward either decreasing or increasing quantities of alcohol, compositions within the scope of our invention are obtained inasmuch as a solution of a cellulose ester results only at temperatures above 50° C., and upon cooling produces homogeneous gels as above described.

If it is desired to increase the temperature of gelation of a cellulose ester solution containing quantities of alcohol below the optimum solubility range, this may be accomplished by further decreasing the proportion of alcohol in the solvent mixture. On the other hand, if it is desired to modify the gelling temperature of a cellulose ester composition containing quantities of alcohol greater than those of optimum solubility, the gelling temperature may be increased or decreased by respectively increasing or decreasing the proportion of alcohol in the toluene-alcohol mixture.

Of the above-mentioned solutions we have found the compositions of Examples 1, 2, and 3 to be outstanding in their ability to give satisfactory photographic film base when employed in accordance with our invention.

In this connection, it is important to note that the matter of permissible solvent content at stripping is one of the distinguishing features of our invention. Film or sheet material produced according to the above-mentioned prior art method must be cured on the film-forming surface until residual solvent is reduced to or below about 10–20% before satisfactory stripping can be attained. Our compositions, on the other hand, are of such nature that they may be satisfactorily stripped from the film-forming surface while containing anywhere from 50 to 80% solvent. It will thus be seen that the film or sheet material of the instant invention is of a fundamentally different nature than similar products produced from the non-gelling type of dope of the prior art.

One of the most outstanding differences between films or sheets produced in accordance with our invention, and similar prior art products, is the fact that they have an extremely low "swell and shrink amplitude," that is, the property of undergoing linear dimensional change in alternately wet and dry condition. As is well known, the swell and shrink characteristics of a photographic film, for example, are of great importance and the most useful films are those having the lowest swell and shrink amplitude. This is of particular importance in films which are to be used for X-ray, portrait, or aerial photography where sheets of appreciable size are employed. Obviously films of high swell and shrink characteristics tend toward internal unevenness which is due, either to buckling of the film in the center, or to curling of the edges—phenomena which are absent from films having a low swell and shrink amplitude and the ability to lie flat without curling. Other types of film which are used in long strips, such as rolls of Cine films, are difficult to process—such materials if of high swell and shrink characteristics, exhibiting appreciable shrinkage after removal from developing or washing solutions, at which time the films are usually mounted on a drying rack. Under such conditions these films tend to become severely tightened resulting in distortion of the film base and the photographic image carried thereby.

It will be seen from the above examples that no hard and fast rules can be laid down as to the composition of our film-forming solutions for all purposes, since the composition of a given solution will be adjusted in accordance with the particular conditions of coating, stripping and curing which are to be employed. In general, it may be said that for a practical process a given composition should be, in accordance with our invention, such that the cellulose derivative in question goes into solution at temperatures at or above 50° C. and remains fluid above that temperature. It should also be such that upon cooling it experiences a rather sharp increase in viscosity within a comparatively narrow temperature range of about 20° C.

It will be apparent that in a practical film-making operation many variations in the solution temperature, wheel temperature, wheel casing air temperature, curing temperature, wheel speed, and many other details of the process may be made within the scope of our invention. As previously indicated, when employing compositions which are solutions above 50° C., the wheel temperature may be in the neighborhood of 10° to 20° C., or at least sufficiently low to bring the dope to, and preferably below its gelation temperature.

At this point it may be well to discuss gelation temperature. By this term we do not necessarily refer to an exact temperature, but rather to a maximum temperature below which the cooling solution or dope undergoes a marked and rather sudden increase in viscosity. While no exact maximum can be specified which will cover all possible cases, we may say that gelation or solidification of those compositions which we have found most satisfactory takes place at temperatures below about 40° C.

The temperature of the wheel casing air, that is, the temperature employed to effect initial curing may also vary, as may the temperatures employed for curing after stripping. It is one of the advantages of our invention, however, that due to the peculiar character of our film-forming compositions which enables them to readily lose solvent, curing may be effected at considerably lower temperatures than those customarily employed in film-making operations.

In general, the curing after stripping of sheet or film material produced in accordance with our invention may be carried out as set forth above by standard curing procedures, that is, by conducting the material through appropriate curing chambers where it is subjected to the action of air maintained at elevated or moderately elevated temperatures. It is desirable to subject the film material to low tension during the curing operation in order that the final product may have the desired physical properties. In fact, the sheet or film material produced in accordance with our invention should be subjected to the least tension possible during curing. This will be particularly desirable in those cases in which the film, after stripping, contains a very high proportion of the original solvent content.

Although our process finds particular application in the manufacture of photographic film support, it is broadly applicable to the manufacture of other types of sheeting, particularly thin sheeting adapted for wrapping purposes.

Our process has many advantages over known film-making processes, but the most outstanding advantage is the tremendous increase in speed of film formation obtainable thereby. While we have referred to stripping times of anywhere from a minute or two to five or six minutes, there is no actual theoretical limit to the stripping time, short of zero. In other words, according to our process, film or sheeting may be stripped almost immediately after coating. It will be appreciated, however, that the actual speed of a given practical film-making operation will be considerably lower than that theoretically obtainable. The operation may be slowed down by the practical necessity or desirability of applying various subbing or backing treatments to the film support during the manufacturing operation. As a general proposition, it may be stated that the film-making speeds obtainable by our process are far beyond anything which has thus far been obtained in the film-making industry. For example, anywhere from ten to twenty minutes are required to cast and strip a film under published procedure, whereas film may be cast and stripped by our process within a minute or even less from the time of deposition of the film-forming composition.

One of the distinguishing and unusual features of our invention is the fact that, due to their peculiar composition and characteristics, satisfactory gelling of our film-forming compositions is quite independent of the thickness of the deposited layer, although the thicker the layer, the lower is the casting speed due to the relatively lower heat transference of thick layers as compared to thin layers. We may, however, produce films or sheets anywhere from a few ten thousandths inch or less to almost any desired thickness. It will thus be seen that our process is adapted not only for the manufacture of photographic film support and even much thinner types of sheeting, such as those employed for wrapping purposes, but also for the manufacture of sheets adapted for use in the fabrication of laminated glass, container stock, and many other products.

What we claim is:

1. A high speed process of making sheeting suitable for photographic film base which comprises dissolving at a temperature above 50° C. a cellulose mixed organic acid ester selected from the group consisting of cellulose acetate propionates and cellulose acetate butyrates containing not less than about 18% propionyl and not less than about 13% butyryl, respectively, and containing not less than about 40% total acyl, said esters having the composition indicated by the respective shaded areas of Figs. 2 and 3 of the drawings, in a liquid which is a solvent for the said cellulose ester only at a temperature above 50° C. and in a weight of such liquid, greater than the weight of the cellulose ester dissolved, which will give a solution which at a temperature within the range of 10–50° C. will form a clear, transparent, self-supporting gel, said liquid being composed of a mixture of toluene and an aliphatic alcohol of 3–5 carbon atoms, casting the solution in the form of a film on a film-forming surface at a temperature of 10–50° C. from a supply thereof having a temperature above its gelation temperature, stripping the film from the film-forming surface while containing at least 50% solvent, and removing residual solvent from the film.

2. A high speed process of making sheeting suitable for photographic film base which comprises dissolving at a temperature above 50° C. a cellulose mixed organic acid ester selected from the group consisting of cellulose acetate propionates and cellulose acetate butyrates containing not less than about 18% propionyl and not less than about 13% butyryl, respectively, and containing not less than about 40% total acyl, said esters having the composition indicated by the respective shaded areas of Figs. 2 and 3 of the drawings, in a liquid which is a solvent for the said cellulose ester only at a temperature above 50° C. and in a weight of such liquid greater than the weight of the cellulose ester dissolved, which will give a solution which at a temperature within the range of 10–50° C. will form a clear, transparent, self-supporting gel, said liquid being composed of a mixture of toluene and an aliphatic alcohol of 3–5 carbon atoms, casting the solution in the form of a film on a film-forming surface at a temperature of 10–50° C. from a supply thereof having a temperature above its gelation temperature, removing a portion of the liquid from the film, stripping the film from the film-forming surface while containing at least 50% solvent, and removing residual solvent from the film.

3. A high speed process of making sheeting suitable for photographic film base which comprises dissolving at about 70° C. a cellulose acetate propionate containing about 20% acetyl and about 25.7% propionyl in a mixture composed of 280 parts by weight of toluene and 120 parts of iso-propyl alcohol and in a weight of such mixture, greater than the weight of the cellulose ester dissolved, which will give a solution which at a temperature within the range of 10–50° C. will form a clear, transparent, self-supporting gel, casting the solution in the form of a film on a film-forming surface at a temperature of about 20° C. from a supply thereof having a temperature above its gelation temperature, whereupon the solution sets to a clear, transparent, self-supporting gel containing substantially all of its original solvent, stripping the film from the film-forming surface while containing at least 50% solvent, and removing residual solvent from the film.

4. A high speed process of making sheeting suitable for photographic film base which comprises dissolving at about 60° C. a cellulose acetate propionate containing about 8.9% acetyl and about 38.7% propionyl in a solvent mixture composed of 450 parts of toluene and 50 parts of iso-propyl alcohol and in a weight of such mixture, greater than the weight of the cellulose ester dissolved, which will give a solution which at a temperature within the range of 10–50° C. will form a clear, transparent, self-supporting gel, casting the solution in the form of a film on a film-forming surface at a temperature of about 20° C. from a supply thereof having a temperature above its gelation temperature, whereupon the solution sets to a clear, transparent, self-supporting gel containing substantially all of its original solvent, stripping the film from the film-forming surface while containing at least 50% solvent and removing residual solvent from the film.

5. A high speed process of making sheeting suitable for photographic film base which comprises dissolving at about 70° C. a cellulose acetate butyrate containing about 25% acetyl and about 20.7 butyryl in a mixture composed of 420 parts of toluene and 180 parts of n-propyl alcohol and in a weight of such mixture, greater than the weight of the cellulose ester dissolved, which will give a solution which at a temperature within the range of 10–50° C. will form a clear, transparent, self-supporting gel, casting the solution in the form of a film on a film-forming surface at a temperature of about 30° C. from a supply thereof having a temperature above its gelation temperature whereupon the solution sets to a clear, transparent self-supporting gel containing substantially all of its original solvent, stripping the film from the film-forming surface while containing at least 50% solvent, and removing residual solvent from the film.

6. A solution adapted for the high speed manufacture of photographic film base and similar products by the gelation process comprising a cellulose mixed organic acid ester selected from the group consisting of cellulose acetate propionates and cellulose acetate butyrates containing not less than about 18% propionyl and not less than about 13% butyryl, respectively, and containing not less than about 40% total acyl, said cellulose esters having the composition indicated by the respective shaded areas of Figs. 2 and 3 of the drawings, dissolved in a liquid which is a solvent for the said cellulose ester only at a temperature above 50° C., and in a weight of such liquid greater than the weight of the cellulose ester dissolved which will give a solution which at a temperature within the range of 10-50° C. will form a clear, transparent, self-supporting gel while containing at least 50% solvent, said liquid being composed of a mixture of toluene and an aliphatic alcohol of not more than 5 carbon atoms.

7. A solution adapted for the high speed manufacture of photographic film base and similar products by the gelation process comprising a cellulose acetate propionate containing about 20% acetyl and about 25.7% propionyl dissolved in a solvent mixture composed of about 280 parts by weight of toluene and 120 parts of iso-propyl alcohol, said mixture being of a weight, greater than the weight of the cellulose ester dissolved, which will give a solution which will form a clear, transparent, self-supporting gel while containing at least 50% solvent at a temperature within the range of 10-50° C.

8. A solution adapted for the high speed manufacture of photographic film base and similar products by the gelation process comprising a cellulose acetate propionate containing about 8.9% acetyl and about 38.7% propionyl dissolved in a solvent mixture composed of about 450 parts of toluene and 50 parts of iso-propyl alcohol, said mixture being of a weight, greater than the weight of the cellulose ester dissolved, which will give a solution which will form a clear, transparent, self-supporting gel while containing at least 50% solvent at a temperature within the range of 10-50° C.

9. A solution adapted for the high speed manufacture of photographic film base and similar products by the gelation process comprising a cellulose acetate butyrate containing about 25% acetyl and about 20.7% butyryl dissolved in a solvent mixture composed of about 420 parts of toluene and 180 parts of n-propyl alcohol, said mixture being of a weight greater than the weight of the cellulose ester dissolved, which will give a solution which will form a clear, transparent, self-supporting gel while containing at least 50% solvent at a temperature within the range of 10-50° C.

CHARLES R. FORDYCE.
WALKER F. HUNTER, Jr.